Oct. 8, 1935.  J. W. WHITE  2,016,761
BRAKE MECHANISM
Filed March 27, 1933
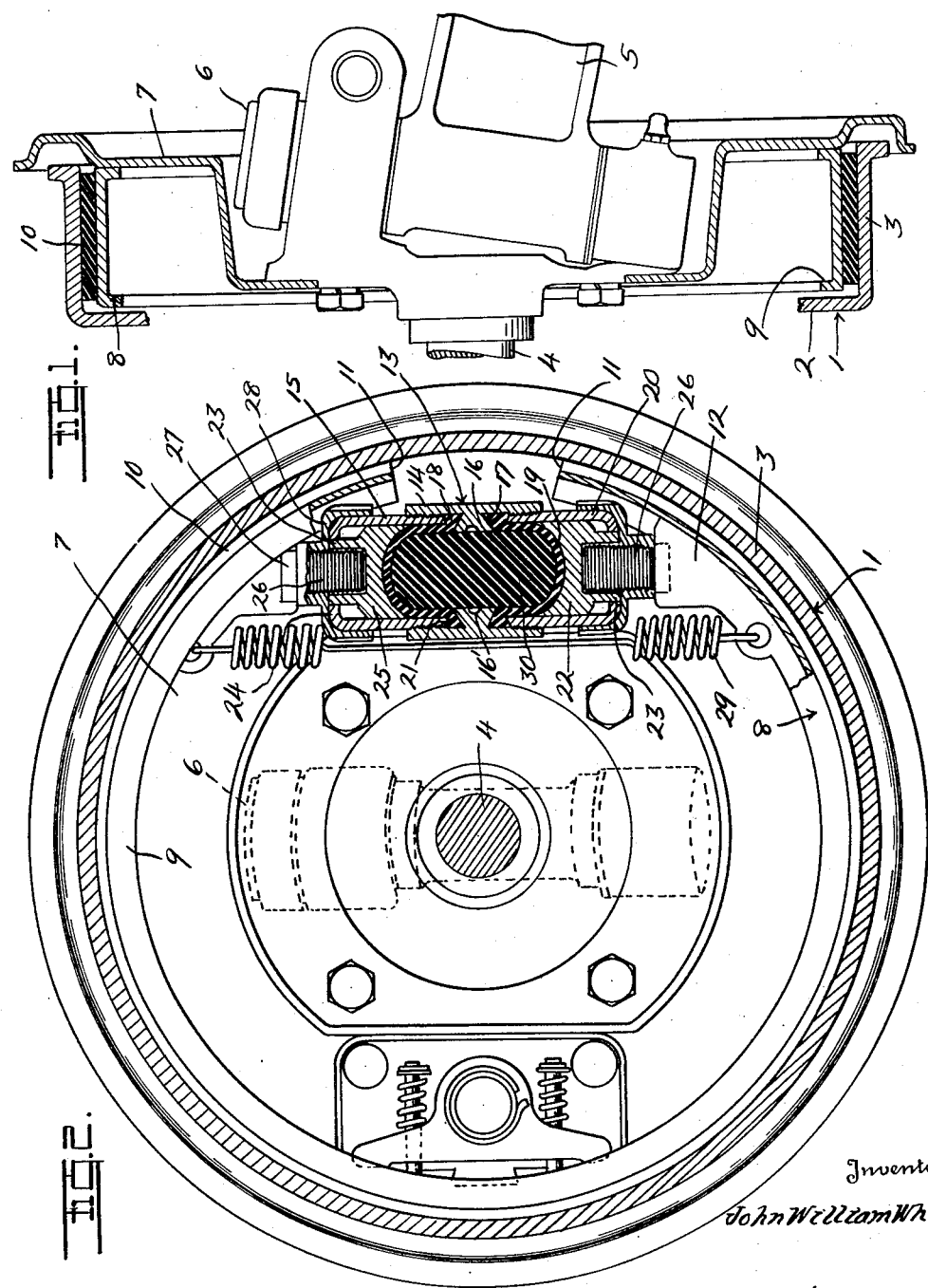
Inventor
John William White
By Whittemore Hulbert Whittemore Belknap
Attorneys Patented Oct. 8, 1935

2,016,761

UNITED STATES PATENT OFFICE

2,016,761

BRAKE MECHANISM

John William White, Detroit, Mich., assignor, by mesne assignments, to General Motors Corporation, a corporation of Delaware Application March 27, 1933, Serial No. 663,084

8 Claims. (Cl. 188—152)

The invention relates to brake mechanism of the hydraulic type and refers more particularly to the vehicle wheel portion of a brake mechanism.

In hydraulic brake mechanisms it has been common practice to locate the actuator for the brake friction means with its axis substantially horizontal between the upper ends of the brake friction means, but when using a brake drum of relatively small diameter with a front wheel of a motor vehicle the size of the actuator is limited because of the small space between the brake drum and the king pin of the wheel. The location of the actuator with its axis vertical and at one side of the king pin has removed this obstacle, but has presented another obstacle when the actuator has been formed with an upper inverted cup-shaped member which is adapted to be moved upwardly by the braking liquid. More particularly, it has been impossible to bleed the air collecting within this cup-shaped member so that solid incompressible operation or operation without lost motion could not be secured.

With my construction, the desired size of the operator may be readily secured and the objectionable collection of air is avioded. Also my construction is such that the actuator normally contains no braking liquid, so that the generation of heat within the brake drum will not vaporize the liquid and will not have an objectionable affect upon the liquid, so that the brake is always in condition for immediate use.

These and other objects of the invention will become apparent from the following description, taken in connection with the accompanying drawing, in which Figure 1 is a transverse section through a brake mechanism embodying my invention;

Figure 2 is a sectional elevation thereof, the back of the brake drum being removed.

1 is the brake drum having the back 2 and the peripheral annular brake flange 3. This brake drum is adapted to be secured to a wheel of a motor vehicle and the wheel, as illustrated, is a front wheel mounted upon the steering spindle 4, which is connected to the front axle 5 of the motor vehicle by the king pin 6. 7 is the backing plate for the brake drum, it being dished to extend within the brake drum and encircle the king pin.

8 is the brake friction means formed in the present instance of the transversely split band 9 of channel-shaped cross section and the brake lining 10, the latter being engageable with the inner face of the brake flange 3. The separable ends 11 of the brake friction means are at one side of the king pin and preferably symmetrically disposed with reference to the horizontal plane passing through the axis of the steering spindle. These ends are provided with the brackets 12 between which is located the hydraulic actuator 13, the axis of which extends other than horizontally and, as shown in the present instance, substantially vertically. The actuator has the support or central housing member 14 which is fixedly secured to the backing plate. This support or housing member has the cylindrical end portions 15 and intermediate these end portions the inwardly extending annular portion 16, which is wedge-shaped in section and provides at its ends the flared annular shoulders 17. Each shoulder is engaged by one side of the wedge-shaped bead 18 of the flexible cup-shaped diaphragm 19, which is preferably formed of rubber. Each diaphragm is clamped in place by the cylindrical retainer 20 which telescopes within a cylindrical end portion 15 and threadedly engages the same and which has the tapered annular surface 21 engageable with the opposed surface of the wedge-shaped bead 18. The diaphragms 19 extend within the retainers and the interior faces of their side walls register with the interior face of the annular portion 16, both being cylindrical. The diaphragms and the annular portion form a chamber for receiving the braking liquid forced thereinto through the inlet passage 16' in the annular portion 16.

22 is a piston slidable within each retainer and having a concave inner face corresponding substantially to the dome of the diaphragm with which it cooperates. Each piston has the reduced outer end or finger 23 which slidably engages the inturned end 24 of the retainer within which the piston is slidable. This reduced end is provided with the axially extending recess 25 into which freely extends the screw 26 having the head 27 at its outer end bifurcated to embrace the adjacent bracket 12. 28 is a nut adjustably threaded upon the screw and adapted to abut the reduced end 23, the arrangement being such that when the braking liquid is forced into the chamber it forces the flexible diaphragms outwardly and through these diaphragms the pistons are forced outwardly carrying with them the nuts 28, which latter move the screws outwardly so that the separable ends of the brake friction means are spread apart. These separable ends are normally retracted by the coil spring 29 which is preferably connected to the brackets 12 and the arrangement is such that the normally retracted position of the separable ends is determined by the nuts 28 contacting with the inturned ends 24 of the retainers 20. As a result, the pistons are always returned to their original positions, at which time they slightly compress the flexible diaphragms. Also by reason of the nuts 28 being adjustably threaded upon the screws 26, adjustments may be readily made for wear of the lining without affecting the limits of movements of the pistons.

For the purpose of expelling all air from the chamber formed by the annular portion 16 of the support and the diaphragms 19 and particularly the upper end portion of this chamber, I have provided the yieldable filler 30 within this chamber. Particularly satisfactory results may be secured by providing a filler capable of being deformed, but being non-porous so as to render the same substantially impervious to air and noncompressible or practically incapable of being compressed into a space of smaller volume. It has been found that a solid block of yieldable material such as a rubber composition having a hardness of from 30% to 40%, as measured by a durometer, possesses the desired characteristics required for the filler. The filler when in natural shape or in normal condition has rounded ends corresponding substantially to the interior faces of the domes of the diaphragms and is slightly longer than the distance between the interior faces of the ends of the flexible diaphragms when the brake friction means is retracted and slightly smaller at its center or waist line than near its ends, so that when the filler is inserted into the chamber and the parts of the actuator are in their normal or retracted positions, the ends of the filler are urged toward each other and the center or waist line is filled out, so that the filler completely fills the chamber and contacts with the interior faces of the member forming the chamber and all air and also all of the braking liquid is completely forced out of the chamber by the filler. Upon inlet of the braking liquid under pressure, the filler assumes its natural shape and, since the viscosity of the material forming the filler is greater than that of the braking liquid, this liquid is allowed to flow past the filler and to operate upon the flexible diaphragms to spread apart the separable ends of the brake friction means.

What I claim as my invention is:

1. In hydraulic brake mechanism, brake friction means, an actuator for the brake friction means, comprising means forming a chamber for receiving the braking liquid, said chamber forming means having a cup-shaped member with its interior forming part of the chamber, and a yieldable filler within said chamber and contacting with the interior face of the cup-shaped member.

2. In hydraulic brake mechanism, brake friction means, an actuator for the brake friction means, comprising means forming a chamber for receiving the braking liquid, said chamber forming means having a cup-shaped member with its interior forming part of the chamber, and a yieldable filler formed of a substantially non-compressible material practically impervious to air within said chamber and contacting with the interior face of the cup-shaped member.

3. In hydraulic brake mechanism, brake friction means, an actuator for the brake friction means, comprising means forming a chamber for receiving the braking liquid, said chamber forming means having opposed cup-shaped members with their interiors forming parts of the chamber, and a yieldable filler within said chamber and contacting with the interior faces of the cup-shaped members.

4. In hydraulic brake mechanism, brake friction means, an actuator for the brake friction means, comprising means forming a chamber for receiving the braking liquid, said chamber forming means having a cup-shaped diaphragm with its interior forming part of the chamber, and a yieldable filler within said chamber and contacting with the interior face of said diaphragm.

5. In hydraulic brake mechanism, brake friction means, a substantially vertically extending actuator for the brake friction means, comprising means forming a chamber for receiving the braking liquid and having a liquid inlet intermediate its ends, said chamber forming means having cup-shaped members at its upper and lower ends with their interiors forming parts of the chamber, and a deformable substantially non-compressible material normally filling said chamber.

6. In hydraulic brake mechanism, brake friction means, an actuator for the brake friction means, comprising means forming a chamber for receiving the braking liquid, said chamber forming means having cup-shaped members open towards each other with their interiors forming parts of the chamber, and a filler formed of a movable substantially non-compressible solid material practically impervious to air and in natural shape having a length slightly greater than the distance between the interiors of the end faces of said cup-shaped members in retracted position.

7. In hydraulic brake mechanism, brake friction means, an actuator for the brake friction means, comprising means forming a chamber for receiving the braking liquids, said chamber forming means comprising a central member having a cylindrical interior face and provided with a liquid inlet opening into its interior and cup-shaped members at opposite sides of said inlet and open towards each other with their interiors forming parts of the chamber and the interior faces of their side walls registering with the interior face of said central member and a filler formed of a movable substantially non-compressible solid material practically impervious to air and in natural shape having a length slightly greater than the distance between the interiors of the end faces of said cup-shaped members in retracted position and also having a cross sectional area intermediate its ends and registering with said inlet slightly smaller than that near its ends, the proportions being such that said filler completely fills the chamber when the cup-shaped members are in retracted position.

8. In hydraulic brake mechanism, brake friction means, an actuator for the brake friction means, comprising means forming a chamber for receiving the braking liquid, said chamber forming means having a cup-shaped member with its interior forming part of the chamber and a deformable substantially non-compressible solid material practically impervious to air within said chamber and normally completely filling the interior of said cup-shaped member.

JOHN WILLIAM WHITE.